United States Patent
Surapaneni

(10) Patent No.: US 12,522,156 B2
(45) Date of Patent: Jan. 13, 2026

(54) DEPLOYABLE FRONT LICENSE PLATE BRACKET

(71) Applicant: FCA US LLC, Auburn Hills, MI (US)

(72) Inventor: Sreekanth Surapaneni, Oakland, MI (US)

(73) Assignee: FCA US LLC, Auburn Hills, MI (US)

( * ) Notice: Subject to any disclaimer, the term of this patent is extended or adjusted under 35 U.S.C. 154(b) by 180 days.

(21) Appl. No.: 18/491,302

(22) Filed: Oct. 20, 2023

(65) Prior Publication Data

US 2025/0128669 A1   Apr. 24, 2025

(51) Int. Cl.
B60R 13/10 (2006.01)

(52) U.S. Cl.
CPC .................. B60R 13/105 (2013.01)

(58) Field of Classification Search
CPC ............... B60R 13/10; B60R 13/105; G09F 2007/1895
See application file for complete search history.

(56) References Cited

U.S. PATENT DOCUMENTS

| | | | |
|---|---|---|---|
| 6,796,060 B1 | 9/2004 | Meester et al. | |
| 7,401,427 B2 | 7/2008 | Zander | |
| 7,818,905 B1 * | 10/2010 | Stahel | B60R 13/105 40/209 |
| 8,245,996 B1 * | 8/2012 | Ciabaszewski | B60R 13/105 280/765.1 |
| D698,294 S * | 1/2014 | Robinson | D12/223 |
| 9,050,938 B2 | 6/2015 | Tran | |
| 9,056,590 B2 | 6/2015 | McKinney | |
| 9,586,538 B2 | 3/2017 | Fontayne | |
| 10,661,728 B2 | 5/2020 | Tsuji et al. | |
| 10,933,820 B1 | 3/2021 | Budraitis et al. | |
| 2017/0259758 A1 * | 9/2017 | Torrey, Jr. | B60R 13/105 |
| 2019/0359152 A1 * | 11/2019 | Diaz, Jr. | G09F 7/22 |

FOREIGN PATENT DOCUMENTS

| | | | |
|---|---|---|---|
| DE | 102009058284 A1 | 6/2011 | |
| JP | H0675920 U | * 10/1994 | |

* cited by examiner

*Primary Examiner* — Cassandra Davis
(74) *Attorney, Agent, or Firm* — Jeremy J. Klobucar

(57) ABSTRACT

A vehicle license plate bracket has a base to mount a license plate, The base is coupled with a brace. The brace secures the bracket to the vehicle. A pivot rotates the base between a first vertical and a second horizontal position. A controller activates the pivot to rotate the base between the positions.

10 Claims, 2 Drawing Sheets

DEPLOYABLE FRONT LICENSE PLATE BRACKET

FIELD

The present disclosure relates to automotive vehicles and, more particularly, to an automotive vehicle front license plate bracket.

BACKGROUND

This section provides background information related to the present disclosure which is not necessarily prior art.

A vehicle front end includes front facia, grille texture, LIDAR, ADAS, cameras and a license plate. All vehicles, such as internal combustions, diesels, electric having a cooling module compromised of heat exchangers including high temperature radiators, low temperature radiators, condensers, transmission oil coolers and fans to dissipate heat or cool the component in the engine compartment. The primary function of a cooling module is to cool the coolants which, in turn, carry heat from the vehicle components such as the engine, EDM, battery, turbo, intercooler, HVAC system with the fan pulling air through the front openings of the vehicle.

In some of the states or territories in the United States and other countries, a front license plate is a mandatory requirement. Thus, in most vehicles, the front license plate and front license plate bracket block, partially, the grille openings thereby starving heat exchangers of airflow. Thus, it would be desirable to actively manage the license plate bracket so that the vehicle can obtain optimum air flow for cooling purposes.

According to the present disclosure, a license plate bracket system actively manages the license plate bracket position. In its normal position, the bracket is hidden into the front end of the vehicle to enable more airflow into the heat exchangers. While on need basis, states that require a viewable license plate, the plate is deployed. The present disclosure includes a controller connected with a GPS system that actively retracts the bracket based on location, specifically in states that mandate front license plates. Additionally, the present disclosure enables manual control of the position of the license plate bracket so that it can be moved to a storage position while the vehicle is moving in a hot ambient environment to provide optimal cooling air to the systems.

SUMMARY

This section provides a general summary of the disclosure, and is not a comprehensive disclosure of its full scope or all of its features.

According to a first aspect of the disclosure, a license plate bracket includes a base to mount a license plate. A brace secures the bracket to a vehicle. The base is coupled with the brace. A pivot rotates the base between a first vertical to a second horizontal position. A controller activates the pivot to rotate the base between the positions. The controller may include a GPS. Also, the controller may be manually operated. The brace is telescoping and the controller rotates the base depending upon a sensed position of the vehicle. The base is generally vertically positioned in territories that require a front license plate and is horizontal in territories that are devoid of front license plate requirements. The base, in its horizontal position, enables additional cooling airflow through the vehicle openings.

According to a second aspect of the disclosure, a vehicle with a license plate bracket comprises a vehicle having a front facia or grille to enable cooling air to pass into an engine compartment. A license bracket is mounted on the front of the vehicle near the front grille or facia. The license plate bracket further comprises a base to mount a license plate. A brace secures the bracket to a vehicle. The base is coupled with the brace. A pivot rotates the base between a first vertical to a second horizontal position. A controller activates the pivot to rotate the base between the positions. The controller may include a GPS. Also, the controller may be manually operated. The brace is telescoping and the controller rotates the base depending upon a sensed position of the vehicle. The base is generally vertically positioned in territories that require front license plate and is horizontal in territories that are devoid of front license requirements. The base, in its horizontal position, enables additional cooling airflow through the vehicle openings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
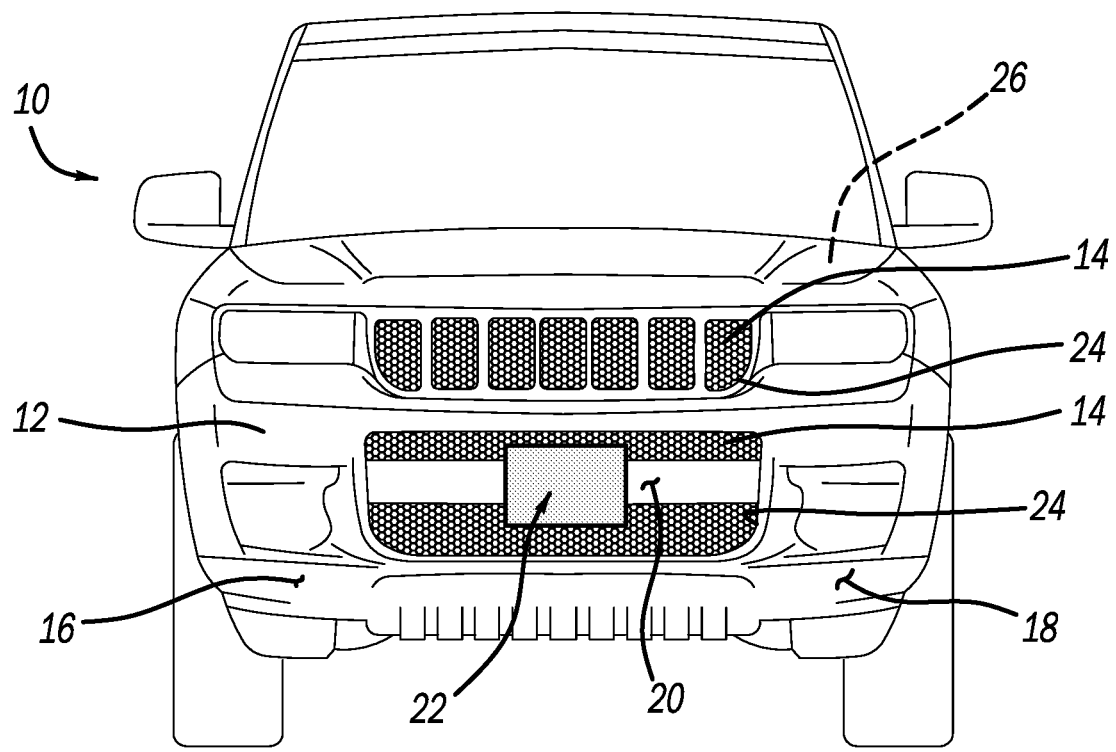
FIG. 1 is a plan view of a vehicle with the license plate bracket in a first position.
Figure 2:
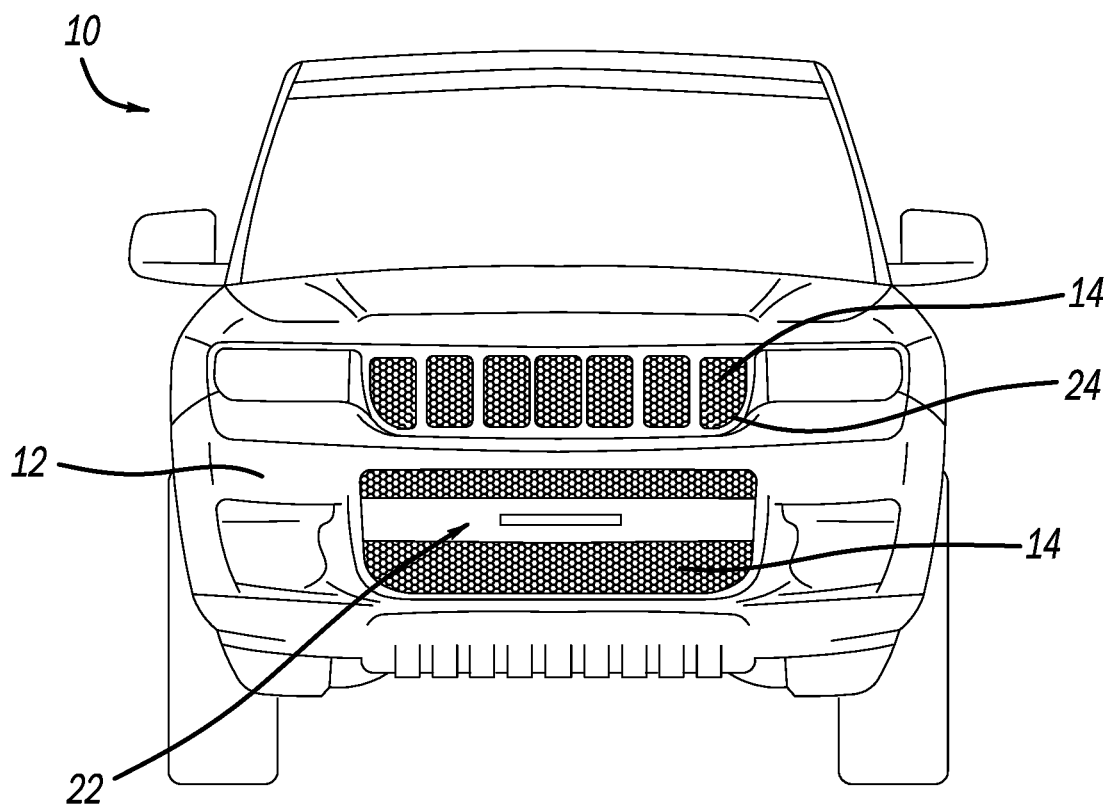
FIG. 2 is a view like FIG. 1 with the license plate bracket in a second position.

Example embodiments will now be described more fully with reference to the accompanying drawings.

Turning to the figures, a vehicle is illustrated and designated with the reference numeral 10. The vehicle includes front facia 12, grille texture 14, LIDAR 16, ADAS 18, cameras 20 and license plate bracket 22.

The grille 14 has several openings 24 to enable cooling air to pass into the engine compartment 26. The cooling air cools components within the engine compartment 26.

Figure 3:
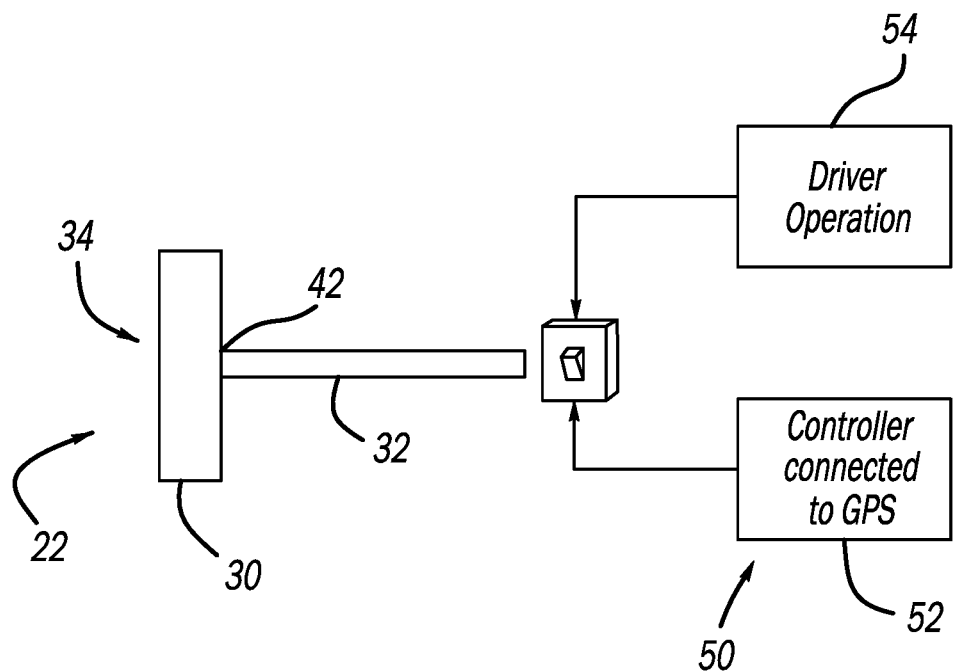
FIG. 3 is a schematic view of the license plate bracket.
Figure 4:
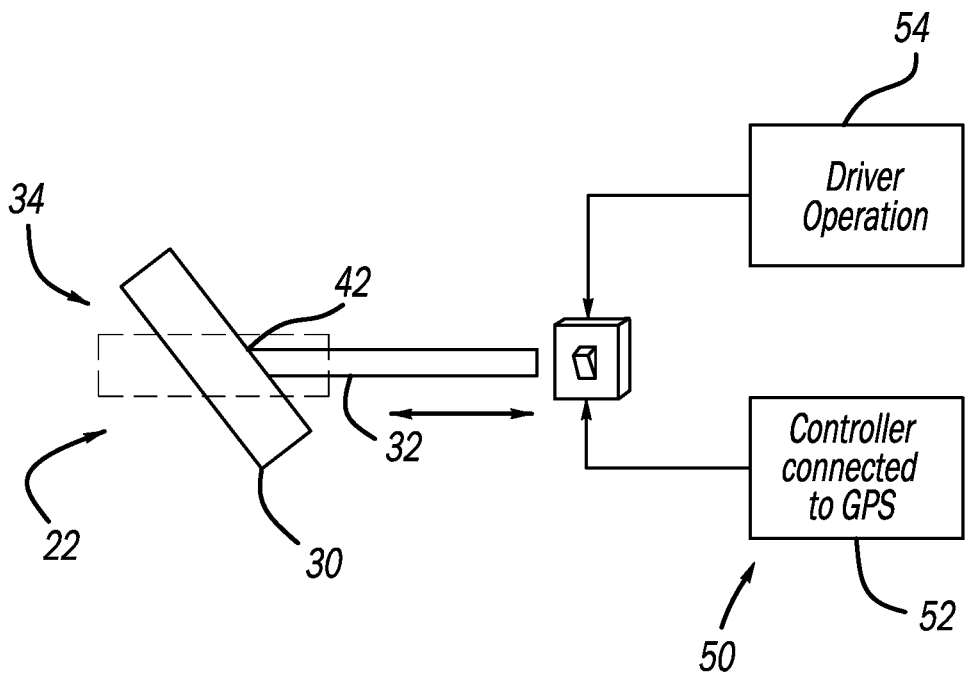
FIG. 4 is a schematic view of FIG. 3 in a second position.

The license plate bracket 22 includes a base 30 and a brace 32. The base 30 receives the license plate 34 positioned on the brace 32. A pivot 42 connects the base 30 with the brace 32. The pivot 42 enables the base 30 to move or rotate between a substantially vertical position, as illustrated in FIG. 3, towards a horizontal position, illustrated in FIG. 4. Thus, the base 24 pivots with respect to the brace 32 to move from blocking air entering into the grille openings to enabling the maximum amount of air to move into the grille openings.

The brace 32 generally is telescoping so that the base 30 of the bracket can be brought into the front end of the vehicle. Thus, the bracket 22 would be hidden or out of the way to enable cooling air to enter into the vehicle.

A control system 50 is coupled with the bracket 22. The control system 50 generally includes a GPS controller 52 and a manual overdrive 54. The GPS system actively manages the license plate bracket 22 based upon the location of the vehicle. Specifically, in states that mandate a front vehicle license plate, the GPS system control would deploy the license plate base 30 into its vertical position during operation in that state or territory.

The manual controller 52 could be operated on a demand basis moving the plate base 30 between a deployed or vertical position to a storage horizontal position. Also, in the horizontal position, the telescopic brace 32 could be activated to bring the base 30 within the vehicle. Thus, the front license plate bracket 22 is actively managed. In its normal operation, the base 30 is hidden into the front end of the vehicle. This enables more cooling air into the engine compartment to cool the heat exchangers. Also, while on a need basis, states or territories that require a front license plate, the bracket would deploy the license plate into its vertical position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle license plate bracket comprising:
   a base for mounting a license plate, the base coupled with a brace;
   the brace for securing to a vehicle;
   a pivot for rotating the base between a first vertical and a second horizontal position; and
   a controller including a GPS for activating the pivot to move the base between the positions.

2. The vehicle license plate bracket of claim 1, wherein the brace is telescoping.

3. The vehicle license plate bracket of claim 1, wherein the controller rotates the base depending upon a sensed position of the vehicle.

4. The vehicle license plate bracket of claim 3, wherein the base is in the first vertical position in territories that require front license plates and is in the second horizontal position in territories that are devoid of front license plate requirements.

5. The vehicle license plate bracket of claim 1, wherein the base in its second horizontal position enables maximum cooling airflow through a vehicle grille.

6. A vehicle with a license plate bracket comprising:
   a vehicle having a front grille enabling cooling air to pass into an engine compartment;
   a license bracket mounted on the front of the vehicle near the front grille, the license bracket further comprising:
   a base for mounting a license plate, the base coupled with a brace;
   the brace for securing to the vehicle;
   a pivot for rotating the base between a first vertical and a second horizontal position; and
   a controller including a GPS for activating the pivot to move the base between the positions.

7. The vehicle with a license plate bracket of claim 6, wherein the brace is telescoping.

8. The vehicle with a license plate bracket of claim 7, wherein the controller rotates the base depending upon a sensed position of the vehicle.

9. The vehicle with a license plate bracket of claim 6, wherein the base is in the first vertical position in territories that require front license plates and is in the second horizontal position in territories that are devoid of front license plate requirements.

10. The vehicle with a license plate bracket of claim 6, wherein the base in its second horizontal position enables maximum cooling airflow through a vehicle grille.

* * * * *